US008782777B2

(12) United States Patent
Friedlander et al.

(10) Patent No.: US 8,782,777 B2
(45) Date of Patent: *Jul. 15, 2014

(54) USE OF SYNTHETIC CONTEXT-BASED OBJECTS TO SECURE DATA STORES

(71) Applicant: International Business Machines Corporation, Armonk, NY (US)

(72) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/628,853

(22) Filed: Sep. 27, 2012

(65) Prior Publication Data

US 2014/0090049 A1 Mar. 27, 2014

(51) Int. Cl.
*G06F 7/04* (2006.01)
*G06F 21/31* (2013.01)

(52) U.S. Cl.
CPC ..................................... *G06F 21/31* (2013.01)
USPC .............. 726/16; 707/792; 707/794; 707/802

(58) Field of Classification Search
CPC ..... G06Q 10/06; G06Q 10/10; G06Q 10/107; G06Q 30/02; G06Q 30/08; G06Q 40/04; G06Q 50/01; G06Q 50/18; G06F 21/31; G06F 21/53; G06F 21/83; H04L 29/12783; H04L 61/35; H04L 63/0227; H04L 67/14; H04L 67/30; H04L 67/1095
USPC ............................. 726/16; 707/792, 794, 802
See application file for complete search history.

(56) References Cited

U.S. PATENT DOCUMENTS

| 5,664,179 A | 9/1997 | Tucker |
| 5,689,620 A | 11/1997 | Kopec et al. |

(Continued)

FOREIGN PATENT DOCUMENTS

| EP | 1566752 A2 | 8/2005 |
| EP | 1843259 A2 | 10/2007 |

(Continued)

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

(Continued)

*Primary Examiner* — Eleni Shiferaw
*Assistant Examiner* — Gregory M Elmore
(74) *Attorney, Agent, or Firm* — John R. Pivnichny; Law Office of Jim Boice

(57) ABSTRACT

A processor-implemented method, system, and/or computer program product secures data stores. A non-contextual data object is associated with a context object to define a synthetic context-based object. The synthetic context-based object is associated with at least one specific data store in a data structure, where the specific data store contains data that is associated with data contained in the non-contextual data object and the context object. An ambiguous request is received from a user for data related to an ambiguous subject-matter. The context of the ambiguous request from the user is determined and associated with the synthetic context-based object that is associated with said a specific data store, where that specific data store contains data related to the context of a now contextual request from the user. The user is then provided access to the specific data store while blocking access to other data stores in the data structure.

13 Claims, 12 Drawing Sheets

(56) References Cited

U.S. PATENT DOCUMENTS

| | | |
|---|---|---|
| 5,701,460 A | 12/1997 | Kaplan et al. |
| 5,974,427 A | 10/1999 | Reiter |
| 6,199,064 B1 | 3/2001 | Schindler |
| 6,275,833 B1 | 8/2001 | Nakamura et al. |
| 6,314,555 B1 | 11/2001 | Ndumu et al. |
| 6,334,156 B1 | 12/2001 | Matsuoka et al. |
| 6,553,371 B2 | 4/2003 | Gutierrez-Rivas et al. |
| 6,633,868 B1 | 10/2003 | Min et al. |
| 6,768,986 B2 | 7/2004 | Cras et al. |
| 7,058,628 B1 | 6/2006 | Page |
| 7,337,174 B1 | 2/2008 | Craig |
| 7,441,264 B2 | 10/2008 | Himmel et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,930,262 B2 | 4/2011 | Friedlander et al. |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 2002/0184401 A1 | 12/2002 | Kadel et al. |
| 2003/0065626 A1 | 4/2003 | Allen |
| 2003/0149562 A1 | 8/2003 | Walther |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0165866 A1 | 7/2005 | Bohannon et al. |
| 2006/0004851 A1 | 1/2006 | Gold et al. |
| 2006/0190195 A1 | 8/2006 | Watanabe et al. |
| 2006/0271586 A1 | 11/2006 | Federighi et al. |
| 2007/0006321 A1 | 1/2007 | Bantz et al. |
| 2007/0016614 A1 | 1/2007 | Novy |
| 2007/0073734 A1 | 3/2007 | Doan et al. |
| 2007/0079356 A1 | 4/2007 | Grinstein |
| 2007/0136048 A1 | 6/2007 | Richardson-Bunbury et al. |
| 2007/0185850 A1 | 8/2007 | Walters et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1* | 11/2008 | Larson et al. .................... 707/4 |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0070640 A1 | 3/2010 | Allen et al. |
| 2010/0088322 A1 | 4/2010 | Chowdhury et al. |
| 2010/0131293 A1 | 5/2010 | Linthicum et al. |
| 2010/0179933 A1 | 7/2010 | Bai et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0282888 A1 | 11/2011 | Koperski et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0016715 A1 | 1/2012 | Brown et al. |
| 2012/0023141 A1 | 1/2012 | Holster |
| 2012/0079493 A1 | 3/2012 | Friedlander et al. |
| 2012/0110004 A1 | 5/2012 | Meijer |
| 2012/0131139 A1 | 5/2012 | Siripurapu et al. |
| 2012/0131468 A1 | 5/2012 | Friedlander et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1* | 9/2012 | O'Malley ..................... 715/810 |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0238667 A1 | 9/2013 | Carvalho et al. |
| 2013/0291098 A1 | 10/2013 | Chung et al. |
| 2014/0012884 A1 | 1/2014 | Bornea et al. |
| 2014/0025702 A1 | 1/2014 | Curtiss et al. |

FOREIGN PATENT DOCUMENTS

| | | | |
|---|---|---|---|
| WO | 2006086179 A2 | 8/2006 | |
| WO | 2007044763 A2 | 4/2007 | |

OTHER PUBLICATIONS

Evaggelio Pitoura et al, "Context in Databases", University of Ioannina, Greece, 2004, pp. 1-19.

U.S. Appl. No. 13/342,406—Non-Final Office Action Mailed Sep. 27, 2013.

U.S. Appl. No. 13/610,347—Non-Final Office Action Mailed Jul. 19, 2013.

U.S. Appl. No. 13/610,347—Notice of Allowance Mailed Aug. 19, 2013.

(56) References Cited

OTHER PUBLICATIONS

M.J. Flynn, et al, "Sparse Distributed Memory Principles of Operation", Research Institute for Advanced Computer Science, 1989, pp. 1-60.

P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.

P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al, "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

U.S. Appl. No. 13/342,305, Friedlander et al.—Specification Filed Jan. 3, 2012.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

W. Caid et al., "Context Vector-Based Text Retrieval", Fair ISAAC Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

Visual Paradigm, "DB Visual Architect 4.0 Designer's Guide: Chapter 6—Mapping Object Model to Data Model and Vice Versa", 2007, pp. 6-2-6-26.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Avinash Kaushik, "End of Dumb Tables in Web Analytics Tools! Hello: Weighted Sort", Sep. 7, 2010, www.kaushik.net, pp. 1-15.

U.S. Appl. No. 13/562,714, Robert R. Friedlander, et al.—Specification and Drawings Filed Jul. 31, 2012.

J. Cheng et al., "Context-Aware Object Connection Discovery in Large Graphs", Data Engineering, 2009. ICDE '09. IEEE 25th International Conference on, pp. 856-867.

R. Angles et al., "Survey of Graph Database Models", ACM Computing Surveys, vol. 40, No. 1, Article 1, Feb. 2008, pp. 1-65.

U.S. Appl. No. 13/592,905—Non-Final Office Action Mailed May 8, 2013.

U.S. Appl. No. 13/592,905—Notice of Allowance Mailed Oct. 25, 2013.

U.S. Appl. No. 13/609,710—Non-Final Office Action Mailed Jan. 27, 2014.

U.S. Appl. No. 13/540,295—Non-Final Office Action Mailed Jan. 30, 2014.

U.S. Appl. No. 13/540,230—Non-Final Office Action Mailed Jan. 30, 2014.

U.S. Appl. No. 13/540,267—Non-Final Office Action Mailed Feb. 4, 2014.

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/595,356—Non-Final Office Action Mailed Apr. 14, 2014.

U.S. Appl. No. 13/342,406—Notice of Allowance Mailed Mar. 20, 2014.

* cited by examiner

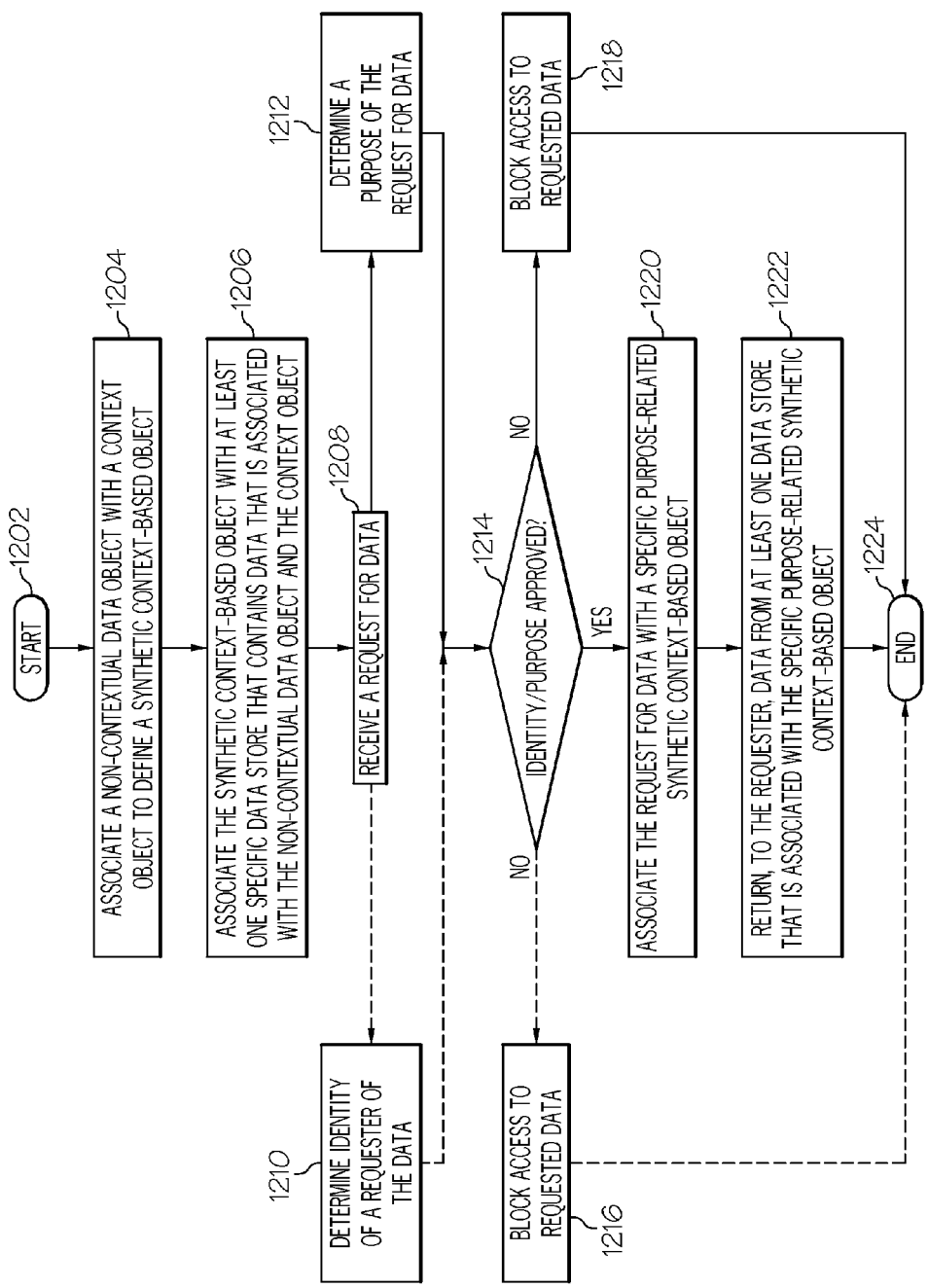

US 8,782,777 B2

USE OF SYNTHETIC CONTEXT-BASED OBJECTS TO SECURE DATA STORES

BACKGROUND

The present disclosure relates to the field of computers, and specifically to the use of databases in computers. Still more particularly, the present disclosure relates to a context-based database.

A database is a collection of data. Examples of database types include relational databases, graph databases, network databases, and object-oriented databases. Each type of database presents data in a non-dynamic manner, in which the data is statically stored.

SUMMARY

A processor-implemented method, system, and/or computer program product secures data stores. A non-contextual data object is associated with a context object to define a synthetic context-based object. The synthetic context-based object is associated with at least one specific data store in a data structure, where the specific data store contains data that is associated with data contained in the non-contextual data object and the context object. An ambiguous request is received from a user for data related to an ambiguous subject-matter. The context of the ambiguous request from the user is determined and associated with the synthetic context-based object that is associated with said a specific data store, where that specific data store contains data related to the context of a now contextual request from the user. The user is then provided access to the specific data store while blocking access to other data stores in the data structure.

BRIEF DESCRIPTION OF THE SEVERAL VIEWS OF THE DRAWINGS

FIG. 12 is a high-level flow chart of one or more steps performed by a computer processor to secure data stores through the use of synthetic context-based objects.

DETAILED DESCRIPTION

Figure 1:
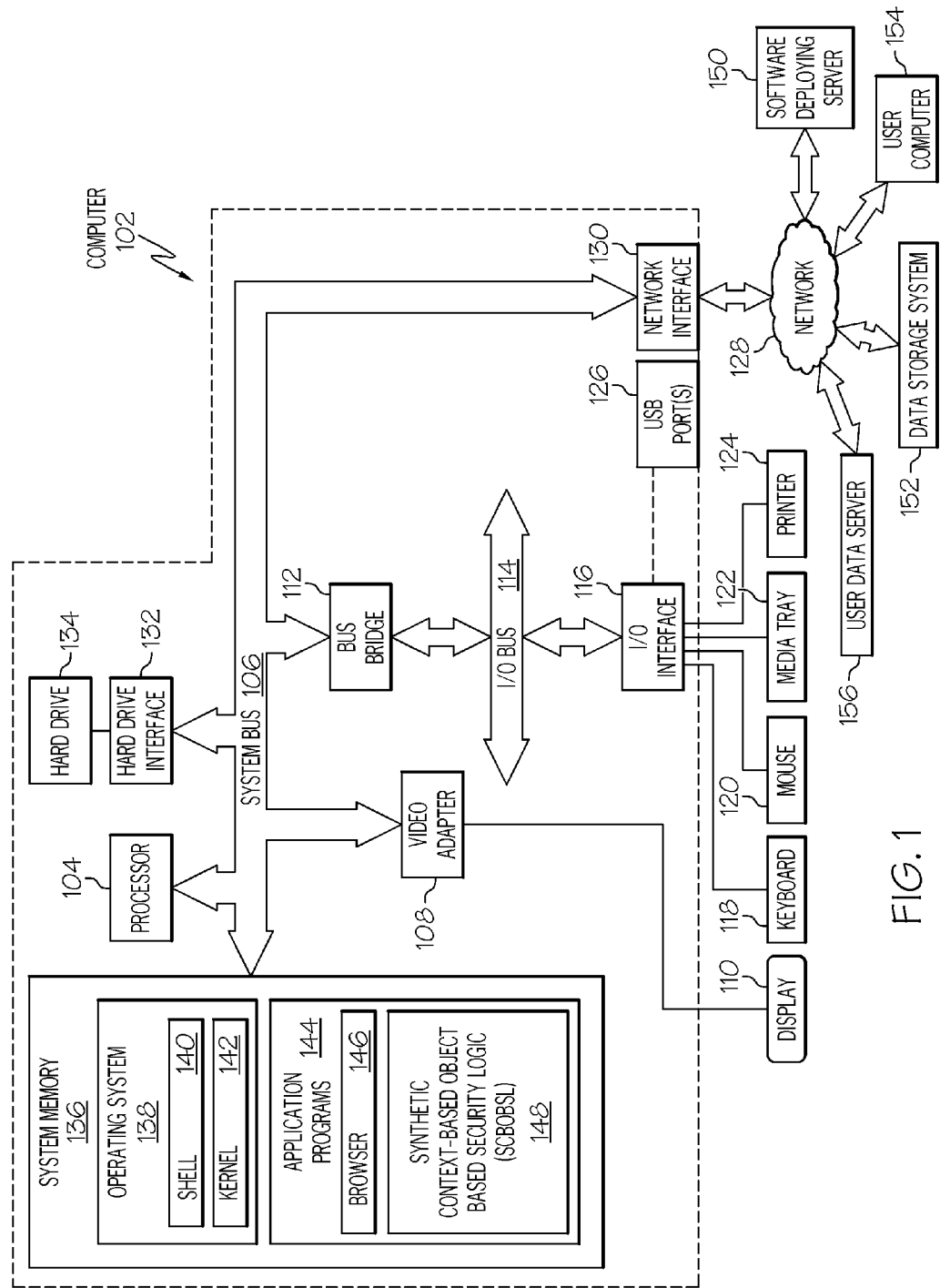
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150, a data storage system 152, a user computer 154, and/or a user data server 156.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a synthetic context-based object based security logic (SCBOBSL) 148. SCBOBSL 148 includes code for implementing the processes described below, including those described in FIGS. 2-12. In one embodiment, computer 102 is able to download SCBOBSL 148 from software deploying server 150, including in an on-demand basis, wherein the code in SCBOBSL 148 is not downloaded until needed for execution. Note further that, in one embodiment of the present invention, software deploying server 150 performs all of the functions associated with the present invention (including execution of SCBOBSL 148), thus freeing computer 102 from having to use its own internal computing resources to execute SCBOBSL 148.

Figure 4:
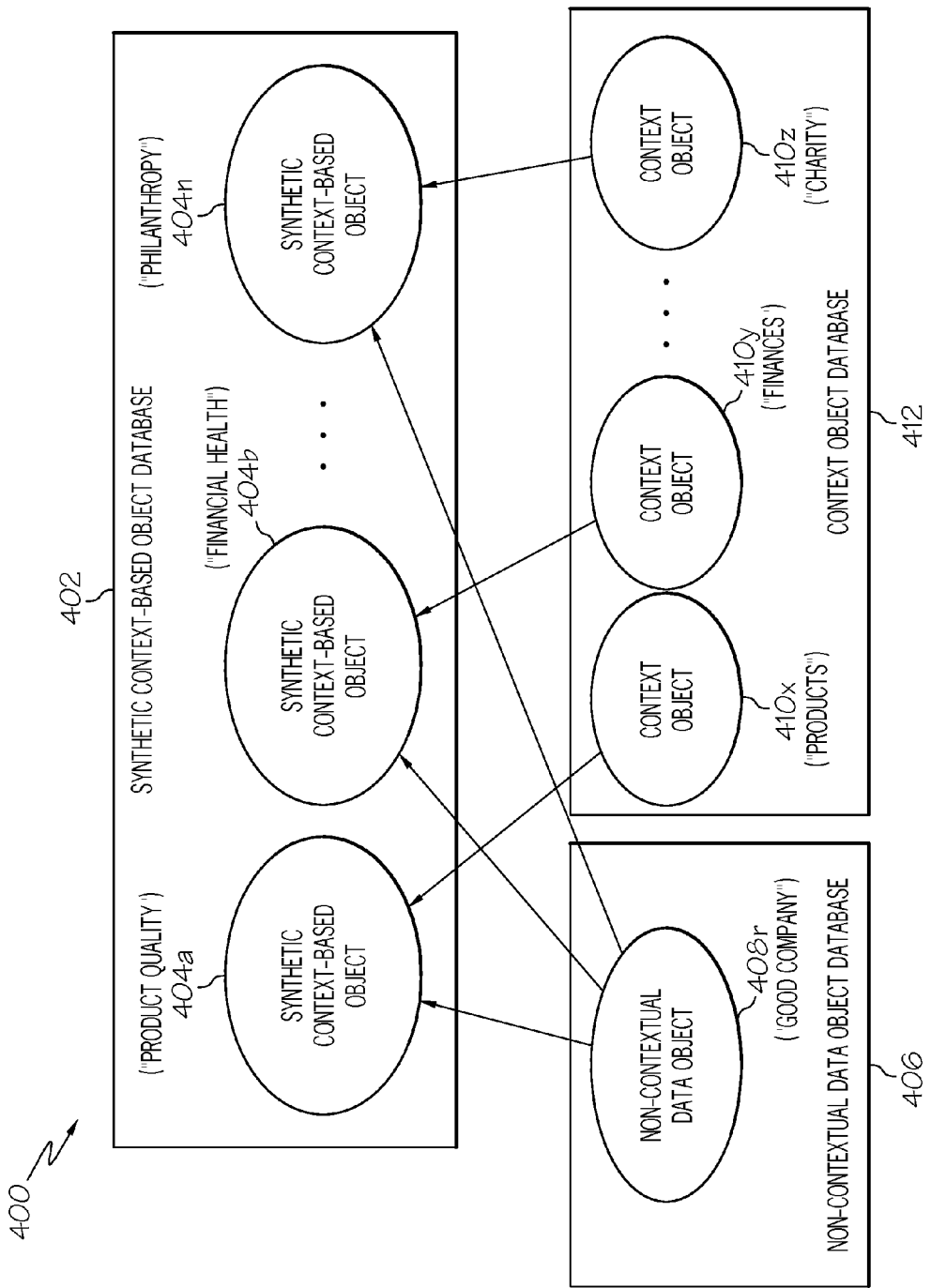
FIG. 4 depicts an exemplary case in which synthetic context-based objects are defined for the non-contextual data object datum "good company"

The data storage system 152 stores an electronic data structure, which may be audio files, video files, website content, text files, etc. In one embodiment, computer 102 contains the synthetic context-based object database described herein, while data storage system 152 contains the non-contextual data object database, context object database, and data structure described herein. For example, in one embodiment, exemplary synthetic context-based object database 202 depicted in FIG. 2 is stored in a synthetic context-based object database storage system, which is part of the hard drive 134 and/or system memory 136 of computer 102 and/or data storage system 152; non-contextual data object database 206 depicted in FIG. 2 is stored in a non-contextual data object database storage system, which is part of the hard drive 134 and/or system memory 136 of computer 102 and/or data storage system 152; context object database 212 depicted in FIG. 2 is stored in a context object database storage system, which is part of the hard drive 134 and/or system memory 136 of computer 102 and/or data storage system 152; and data structure 504 depicted in FIG. 4 is stored in a data structure storage system, which is part of the hard drive 134 and/or system memory 136 of computer 102 and/or data storage system 152.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that SCBOBSL 148 is able to generate and/or utilize some or all of the databases depicted in the context-based system referenced in FIGS. 2-12.

Figure 2:
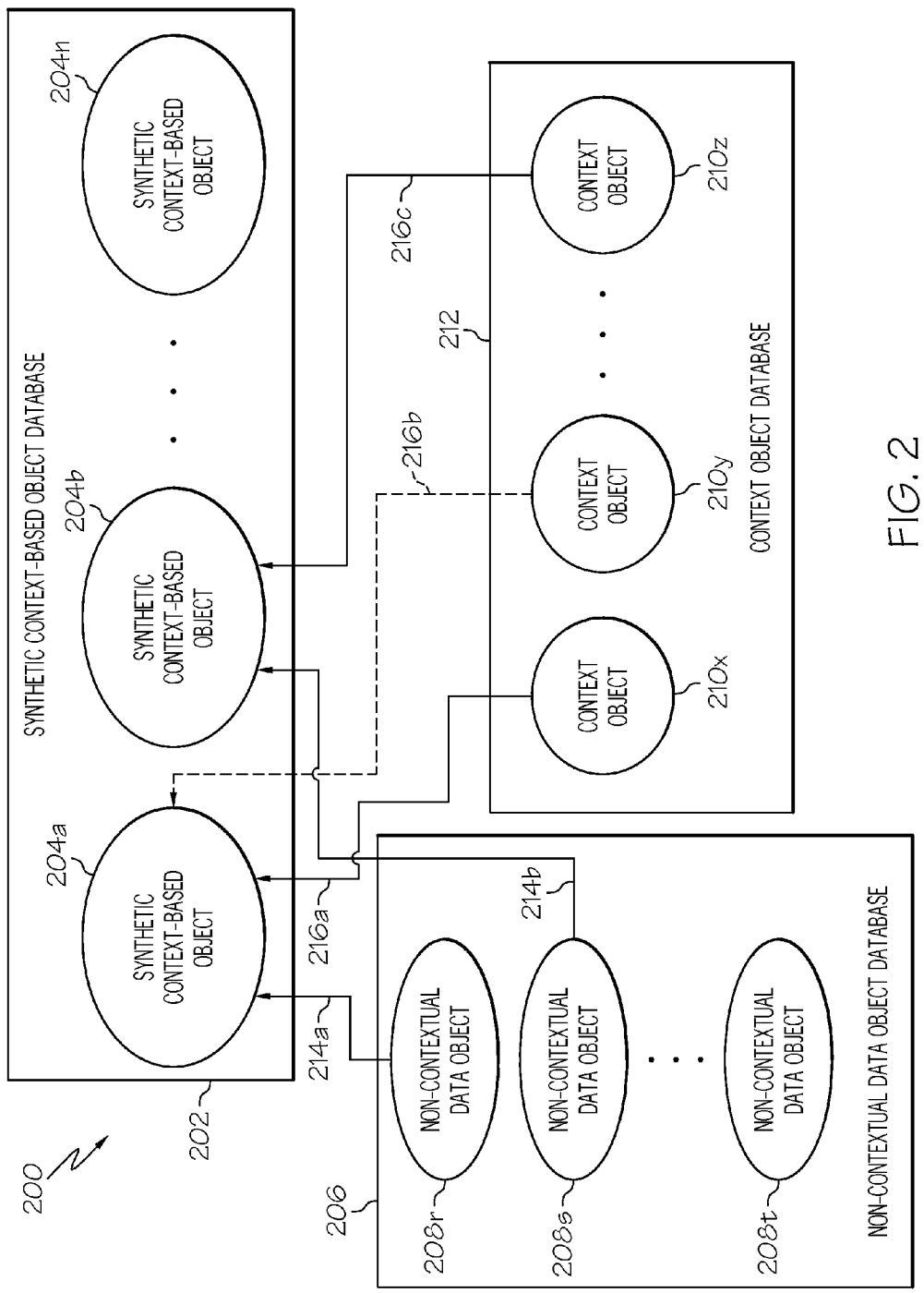
FIG. 2 illustrates a process for generating one or more synthetic context-based objects.
Figure 3:
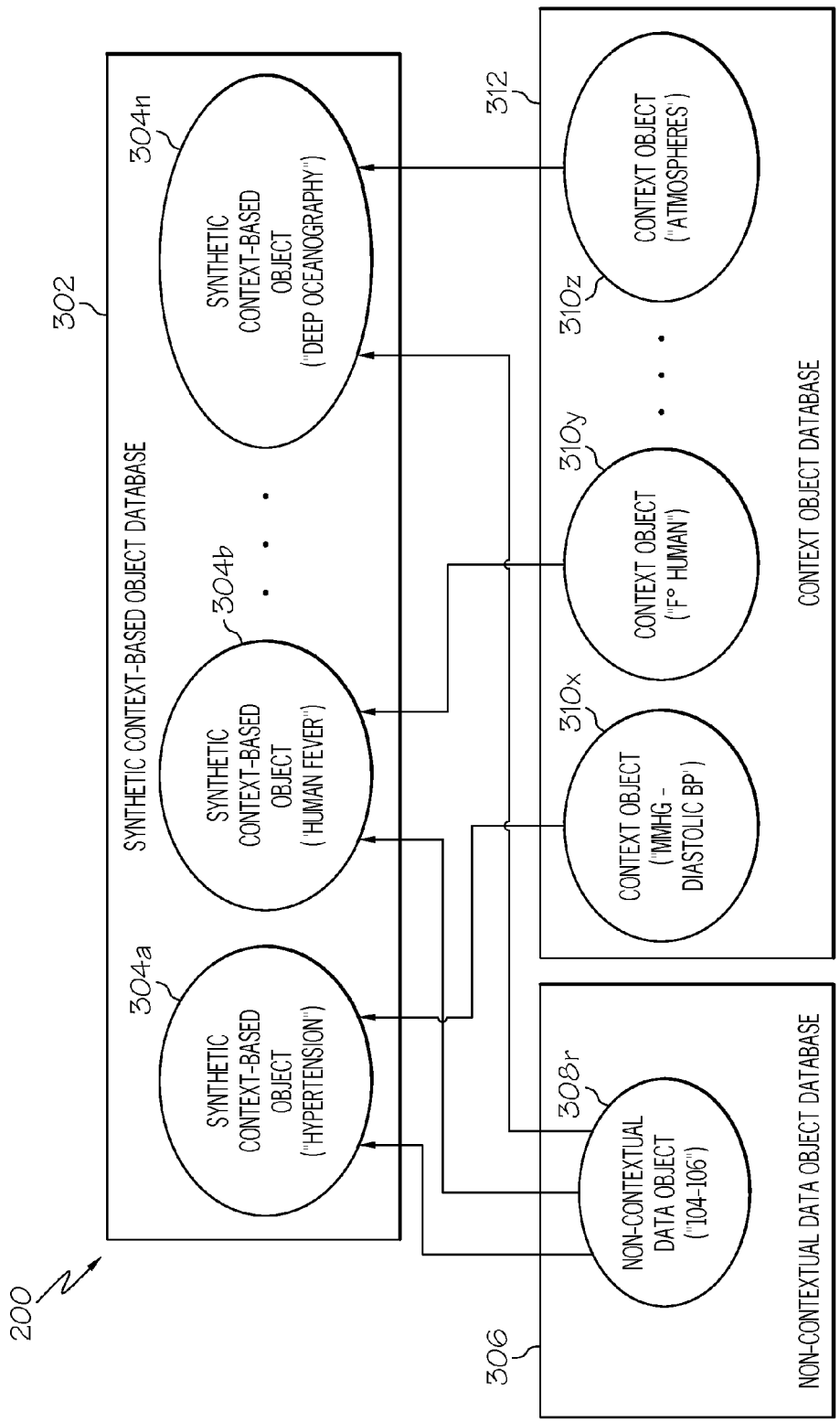
FIG. 3 illustrates an exemplary case in which synthetic context-based objects are defined for the non-contextual data object data "104-106"

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself, and therefore ambiguously describe multiple subject-matters. That is, the data in the context objects are not merely attributes or descriptors of the data/objects described by the non-contextual data objects. Rather, the context objects provide additional information about the non-contextual data objects in order to give these non-contextual data objects meaning Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Note that the data within the non-contextual data objects described herein are so ambiguous that there are essentially meaningless. For example, consider the exemplary case depicted in FIG. 3, where data from the non-contextual data object 308r is simply the term/values "104-106". Standing alone, "104-106" is meaningless. As depicted, data from the non-contextual data object 308r is associated with (e.g., stored in or associated by a look-up table, etc.) a synthetic context-based object 304a, which is devoted to the subject-matter "hypertension". This data ("104-106") from non-contextual data object 308e is also associated with a synthetic context-based object 304b, which is devoted to the subject-matter "human fever" and a synthetic context-based object 304n, which is devoted to the subject-matter "deep oceanography". In order to give contextual meaning to the term/values "104-106" (i.e., define the term/values "104-106") in the context of "hypertension", context object 310x, which contains the context data "millimeters of mercury" and "diastolic blood pressure"" is also associated with (e.g., stored in or associated by a look-up table, etc.) the synthetic context-based object 304a. Thus, multiple context data can provide not only the scale/units (millimeters of mercury) context of the values "104-106", but the data can also provide the context data "diastolic blood pressure" needed to identify the subject-matter (hypertension) of the synthetic context-based object 304a.

Similarly, associated with the synthetic context-based object 304b is a context object 310y, which provides the context data of "degrees on the Fahrenheit scale" and "human" to the term/values "104-106" provided by the non-contextual data object 308r. Thus, the synthetic context-based object 304b now defines term/values "104-106" as that which is related to the subject matter of "human fever". Similarly, associated with the synthetic context-based object 304n is a context object 310z, which provides the context data of "atmospheres" to the term/values "104-106" provided by the non-contextual data object 308r. In this case, the generator of the synthetic context-based object database 302 determines that high numbers of atmospheres are used to define deep ocean pressures. Thus, the synthetic context-based object 304n now defines term/values "104-106" as that which is related to the subject matter of "deep oceanography".

With reference now to FIG. 4, data from the non-contextual data object 408r is the term "good company". Standing alone, "good company" is meaningless, since the term "good" is vague/ambiguous. As depicted, data from the non-contextual data object 408r is associated with (e.g., stored in or associated by a look-up table, etc.) a synthetic context-based object 404a, which is devoted to the subject-matter "product quality". The non-contextual data ("good company") from non-contextual data object 408r is also associated with a synthetic context-based object 404b, which is devoted to the subject-matter "financial health" and a synthetic context-based object 404n, which is devoted to the subject-matter "philanthropy". In order to give contextual meaning to the term/values "good company" (i.e., define what is meant by "good company") in the context of "product quality", context object 410x, which contains context data related to "products" is also associated with (e.g., stored in or associated by a look-up table, etc.) the synthetic context-based object 404a.

Similarly, associated with the synthetic context-based object 404b is a context object 410y, which provides the context data of "finances" to the term "good company" provided by the non-contextual data object 408r. Thus, the synthetic context-based object 404b now defines the term "good company" as that which is related to the subject matter of "financial health" of a company. Similarly, associated with the synthetic context-based object 404n is a context object 410z, which provides the context data of "charity" to the term "good company" provided by the non-contextual data object 408r. Thus, the synthetic context-based object 404n now defines the term "good company" according to its history of donating to "charity".

Figure 5:
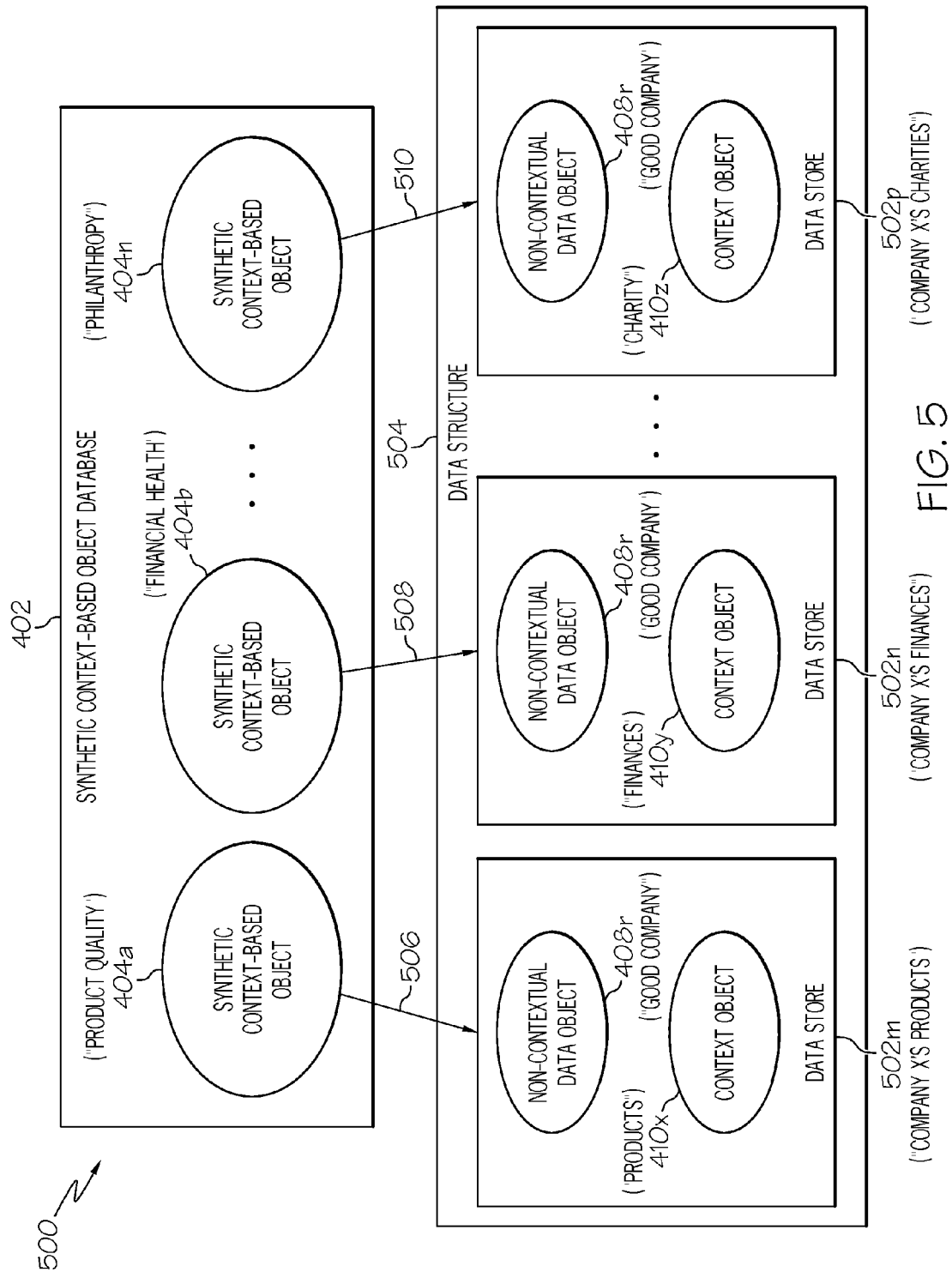
FIG. 5 illustrates a process for associating one or more data stores with specific synthetic context-based objects.

Once the synthetic context-based objects are defined, they can be linked to data stores. A data store is defined as a data repository of a set of integrated data, such as text files, video files, webpages, etc. With reference now to FIG. 5, a process for associating one or more data stores with specific synthetic context-based objects in a system 500 is presented. Note that system 500 is a processing and storage logic found in computer 102 and/or data storage system 152 shown in FIG. 1, which process, support, and/or contain the databases, pointers, and objects depicted in FIG. 5. The data structure 504 is a database of multiple data stores 502m-502p (thus indicating a "p" number of data stores, where "p" is an integer), which may be text documents, hierarchical files, tuples, object oriented database stores, spreadsheet cells, uniform resource locators (URLs), etc.

That is, in one embodiment, the data structure 504 is a database of text documents (represented by one or more of the data stores 502m-502p), such as journal articles, webpage articles, electronically-stored business/medical/operational notes, etc.

In one embodiment, the data structure 504 is a database of text, audio, video, multimedia, etc. files (represented by one or more of the data stores 502m-502p) that are stored in a hierarchical manner, such as in a tree diagram, a lightweight directory access protocol (LDAP) folder, etc.

In one embodiment, the data structure 504 is a relational database, which is a collection of data items organized through a set of formally described tables. A table is made up of one or more rows, known as "tuples". Each of the tuples (represented by one or more of the data stores 502m-502p) share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the data structure 504 is an object oriented database, which stores objects (represented by one or more of the data stores 502m-502p). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data.

In one embodiment, the data structure 504 is a spreadsheet, which is made up of rows and columns of cells (represented by one or more of the data stores 502m-502p). Each cell (represented by one or more of the data stores 502m-502p) contains numeric or text data, or a formula to calculate a value based on the content of one or more of the other cells in the spreadsheet.

In one embodiment, the data structure 504 is a collection of universal resource locators (URLs) for identifying a webpage, in which each URL (or a collection of URLs) is represented by one or more of the data stores 502m-502p.

These described types of data stores are exemplary, and are not to be construed as limiting what types of data stores are found within data structure 504.

Note that the data structure 504 is homogenous in one embodiment, while data structure 504 is heterogeneous in another embodiment. For example, assume in a first example that data structure 504 is a relational database, and all of the data stores 502m-502p are tuples. In this first example, data structure 504 is homogenous, since all of the data stores 502m-502p are of the same type. However, assume in a second example that data store 502m is a text document, data store 502n is a financial spreadsheet, data store 502p is a tuple from a relational database, etc. In this second example, data structure 504 is a heterogeneous data structure, since it contains data stores that are of different formats.

FIG. 5 thus represents various data stores being "laid over" one or more of the synthetic context-based objects 404a-404n. That is, one or more of the data stores 502m-502p is mapped to a particular synthetic context-based object from the synthetic context-based objects 404a-404n, in order to facilitate exploring/searching the data structure 504. For example, a pointer 506 (e.g., an identifier located within both synthetic context-based object 404a and data store 502m) points the synthetic context-based object 404a to the data store 502m, based on the fact that the data store 502m contains data ("good company") found in the non-contextual data object 408r as well as data ("products") in the context object 410x, which together gave the subject-matter meaning to the synthetic context-based object 404a as described above. Similarly, pointer 508 points the synthetic context-based object 404b to the data store 502n, since synthetic context based object 404b and data store 502n both contain data from the non-contextual data object 408r as well as the context object 410y. Similarly, pointer 510 points the synthetic context-based object 404n to the data store 502p, since synthetic context based object 404n and data store 502p both contain data from the non-contextual data object 408r as well as the context object 410z.

As described in FIG. 5, the pointers enable various data stores to be associated with subject-matter-specific synthetic context based objects. This association facilitates searching the data structure 504 according to the subject-matter, which is defined by the combination of data from the non-contextual data object and the context object, of a particular synthetic context-based object.

Figure 6:
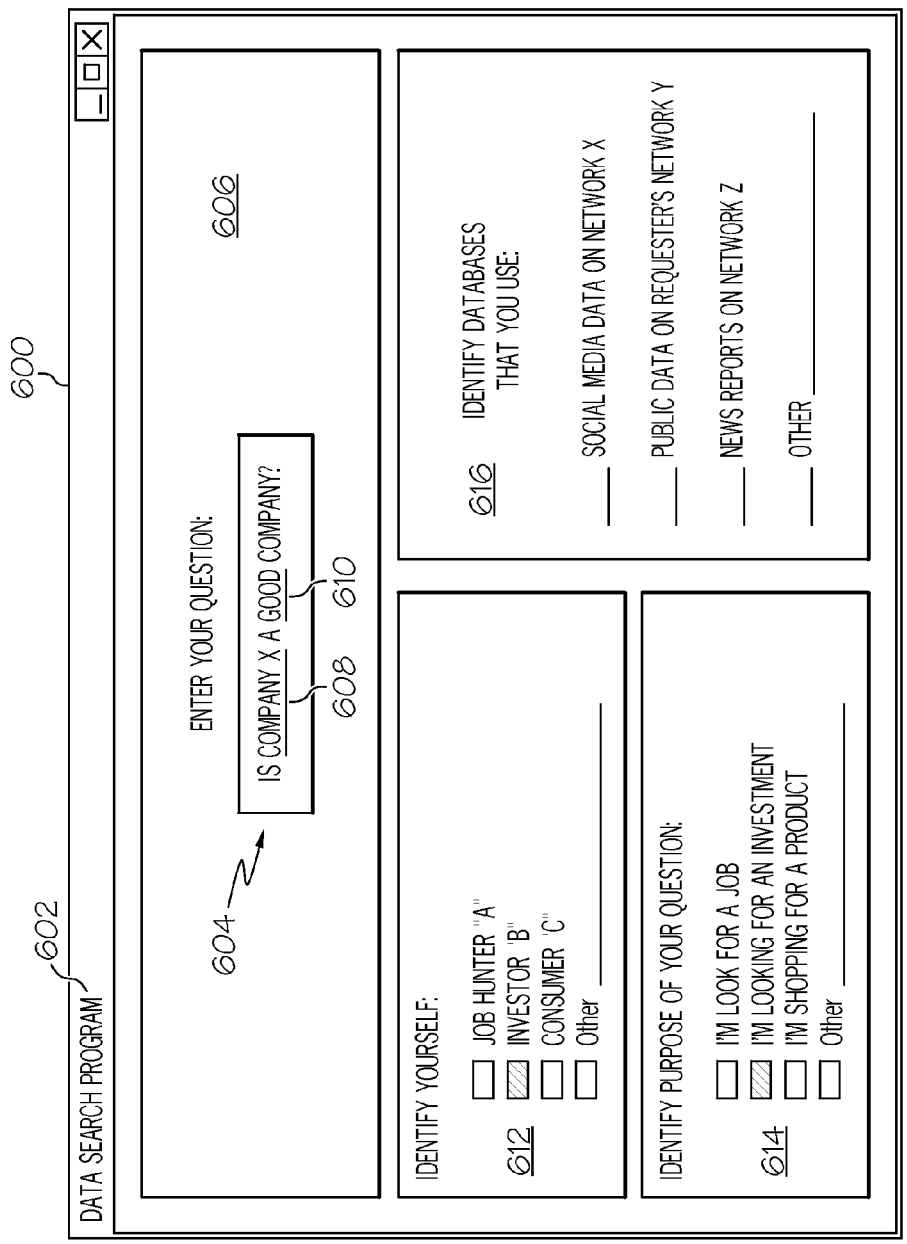
FIG. 6 depicts an exemplary user interface that enables a user request for data related to an ambiguous topic.

With reference now to FIG. 6, an exemplary user interface 600, which presents a data search program 602 that enables a user request for data related to an ambiguous topic, is presented. For example, assume that a user enters a question in an active field 604 of a pane 606 regarding a company (highlighted field 608). More specifically, the user asks if "Company X" is a "good" (highlighted field 610) company. (Note that the terms "Company X" and "good" may be entered into predefined active fields, or they may be highlighted/designated by contextual interpretation of the query "Is Company X a good company?") Standing alone, this query is so ambiguous that it is meaningless. That is, what is meant by "good"? However, by associating this query to one of particular synthetic context-based objects described herein, an appropriate data store to answer the query can be located.

In addition, the context of the query is used in one embodiment to provide security to data stores. That is, if the user's request is intended to elicit information about one topic, then information about another topic is protected (e.g., hidden from the inquiring user). With reference then to system 700 in FIG. 7, assume that a user is using a requesting computer 702 (e.g., user computer 154 depicted in FIG. 1) to send out a query 704 (e.g., "Is Company X a good company?"). A security module 706 matches this query 704 to one of the synthetic context-based objects 404a-404n, via pointers 708, 710, or 712, based on the context of the query. The context of this query may be based on one or more factors.

For example, in one embodiment, the context of the query is simply based on the identity of the user. Thus, assume that the user checked in pane 612 of FIG. 6 that she is "Investor B", which identifies her as a specific person. Based on this user identity, the security module 706 may look her up in a table, and determine that she is authorized to access any data store that is pointed to by synthetic context-based object 404b, (and thus provides information about Company X's finances) but is prohibited from accessing any data store that is pointed to by synthetic context-based objects 404a or 404n in FIG. 7. Thus, the "context of the query" is based on "who" is asking the question.

In one embodiment, the context of the query is based on a purpose of the query. For example, assume that the user indicated in pane 614 in FIG. 6 that he is "Looking for an investment". This context would cause the security module 706 to determine that the request should be directed to the synthetic context-based object 404b (such that the user receives information about Company X's finances), but prohibits the user from accessing any data store that is pointed to by synthetic context-based objects 404a or 404n in FIG. 7, since they are not directly related to the company's finances.

While the purpose, and thus the context, of the query can be based on the user's input into pane 614 of FIG. 6, in one embodiment the purpose/context of the request is determined by identifying what databases (presented in pane 616) are used by the requesting user. Thus, if the requesting user uses social media networks and webpages that are devoted to financial investments, then the context/purpose of the request is deemed to be related to Company X's financial health, and the query 704 is directed by security module 706 to only synthetic context-based object 404b in FIG. 7.

Figure 7:
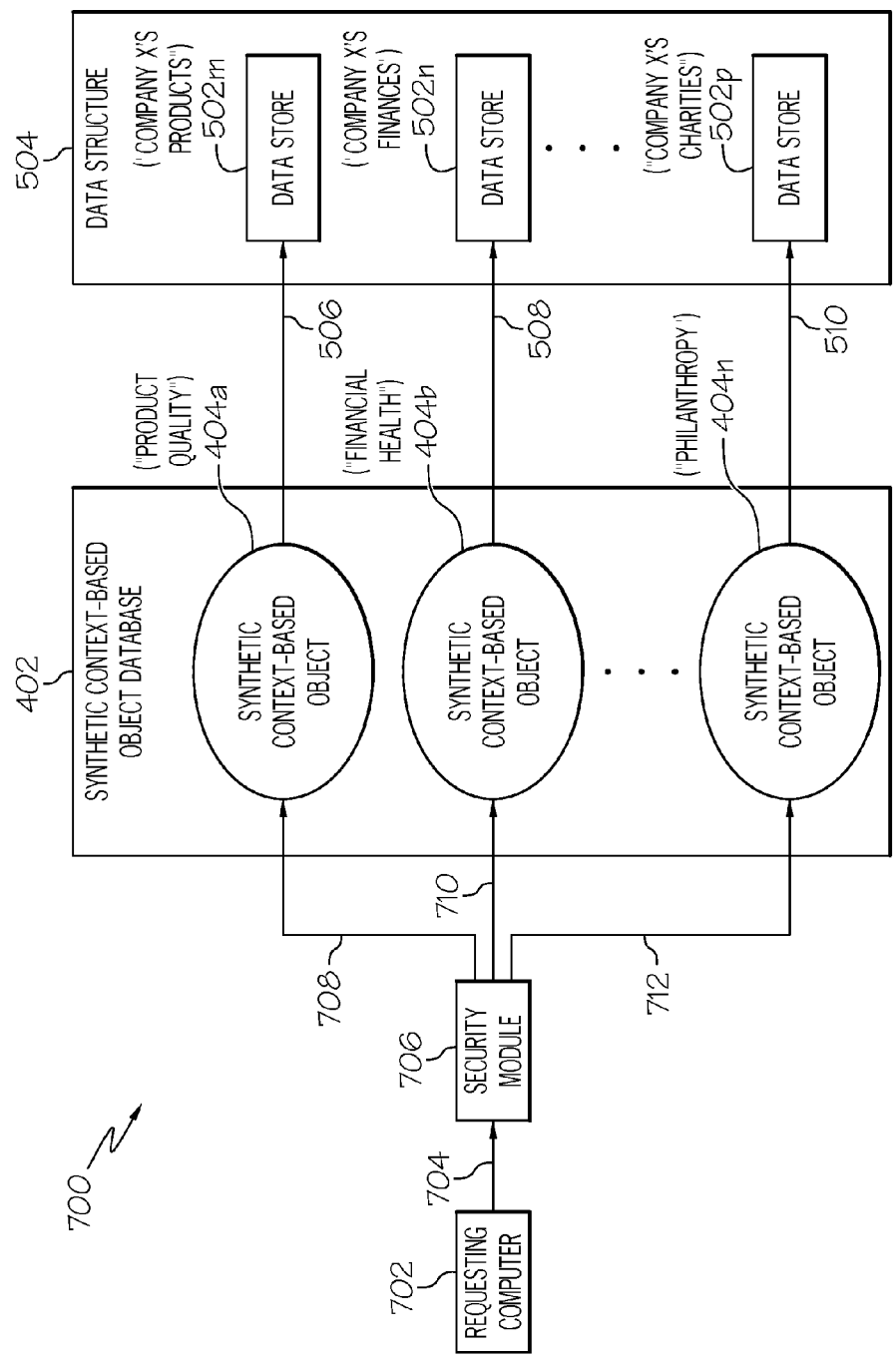
FIG. 7 depicts a process for applying security protection to a particular data store through the use of a particular synthetic context-based object.

Note that the process described in FIG. 7 does not merely direct a request to an appropriate data store, but it also provides security to other data stores within a data structure. For example, if the security module 706 in FIG. 7 determines that the context of the user's request is in the realm of company finances, then the request is directed to only those financial data stores that are available to the public, and blocks access to private financial data of Company X. However, if the requesting user indicates in UI 600 of FIG. 6 that the purpose of her request is to conduct a financial audit of Company X, then the request will be directed to financial information that is normally confidential, assuming that security module 706 is able to confirm that the requesting user is authorized to access such data. In one embodiment, security module 706 confirms such authorization by checking the identity of the requesting user, in order to determine if she is on an approved list. In one embodiment, security module 706 confirms such authorization merely by the stated purpose (from pane 614) of the query, assuming that other safeguards (e.g., a firewall, etc.) are in place to protect the sensitive data of Company X.

While the synthetic context-based objects described above are single-tiered (i.e., are derived from a single non-contextual data object plus one or more context objects), in one embodiment the synthetic context-based objects are hierarchical. For example, consider system 800 in FIG. 8. Synthetic context-based object 404a described above may be determined as vague and ambiguous, since the context of "product quality" can have multiple meanings Thus, it may not be possible to point to a meaningful data store as described above. However, in this embodiment, the synthetic context-based object 404a is redefined as a non-contextual data object 808r, which is used to populate synthetic context-based objects 810a-810n in a synthetic context-based object database 802. These synthetic context-based objects 810a-810n are provided meaningful context from the context objects 808x-808z. Thus, synthetic context-based object 810a is now understood to pertain to the context of "product safety".

However, even the term "product safety" may be too vague to point to a meaningful data store. Thus, as described in FIG. 9, synthetic context-based object 810a is redefined as a non-contextual data object 908r, which is used to populate synthetic context-based objects 910a-910n in a synthetic context-based object database 902. These synthetic context-based objects 910a-910n are provided meaningful context from the context objects 908x-908z. Thus, synthetic context-based object 910b is now understood to pertain to the context of the "product testing protocol" records of products made by Company X.

Figure 9:
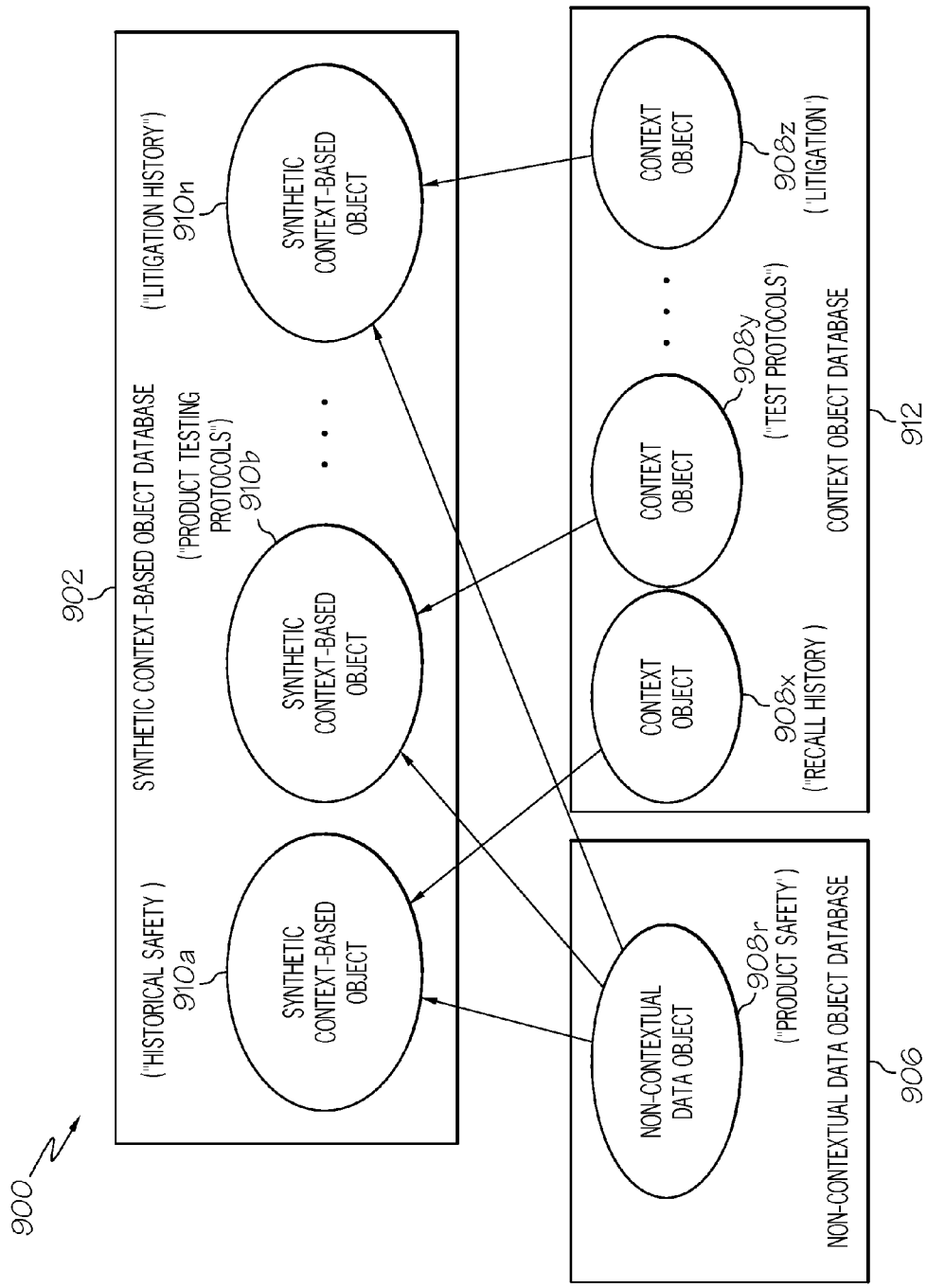
Figure 10:
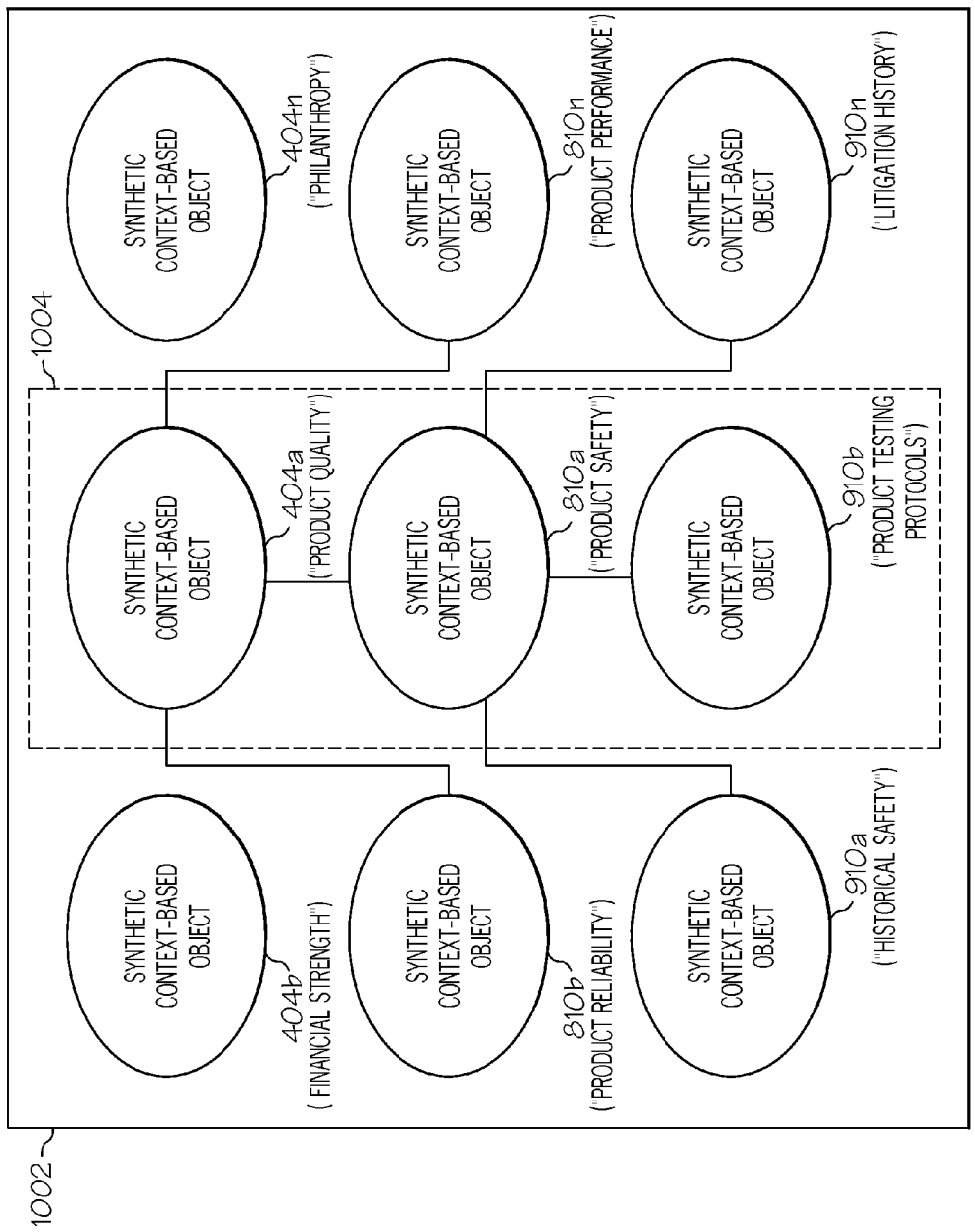
FIG. 10 depicts a hierarchical synthetic context-based object database.

Once the hierarchical synthetic context-based objects are generated (as described in FIG. 8-FIG. 9), they can be arranged in a hierarchical synthetic context-based object database 1002, as depicted in FIG. 10. For example, vertical library 1004 includes the synthetic context-based objects 404a, 810a, and 910b as described above.

Figure 11:
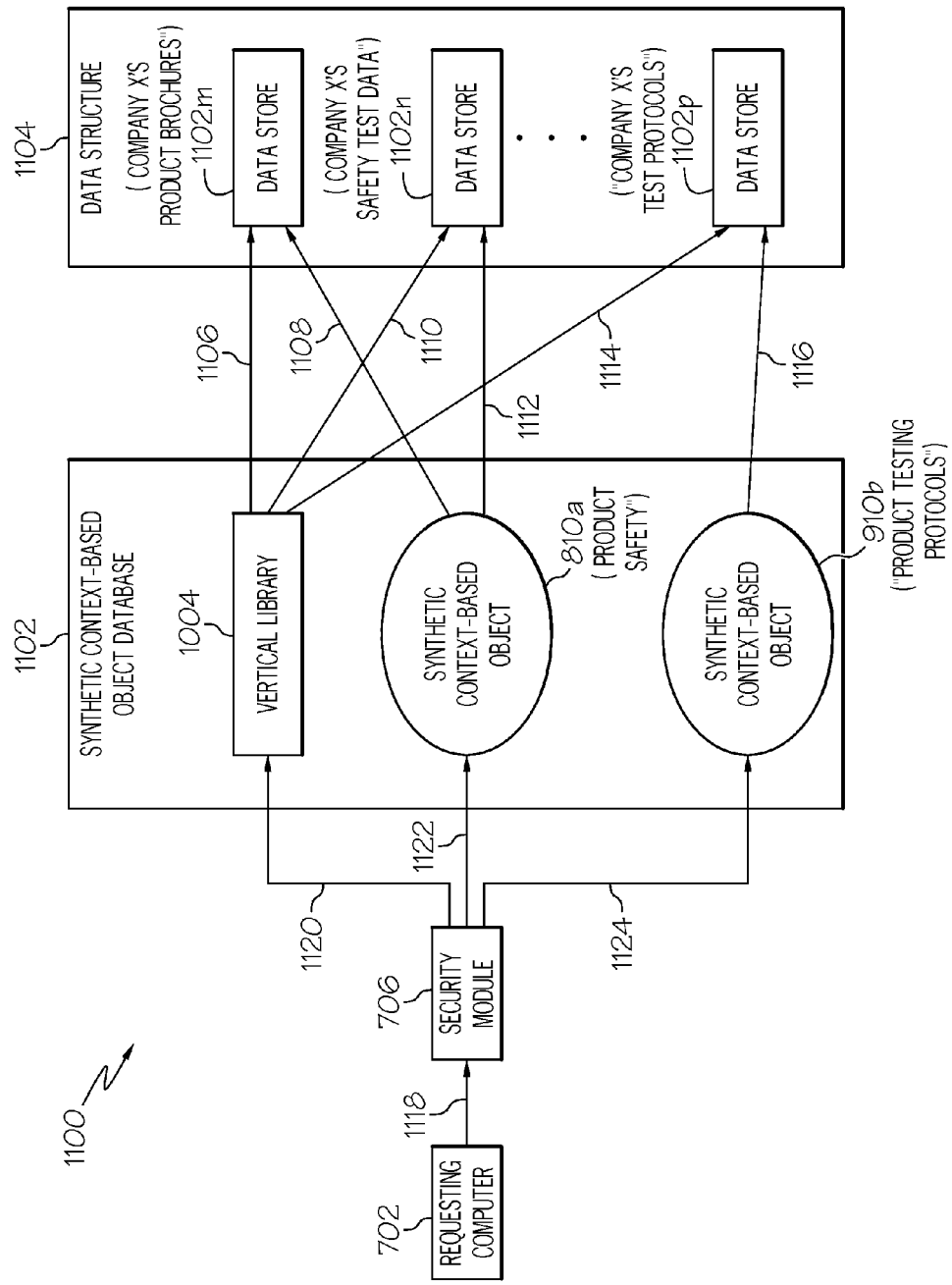
FIG. 11 illustrates a process for applying security protection to one or more data stores through the use of a hierarchical synthetic context-based object library.

With reference then to FIG. 11, a process for applying security protection to one or more data stores through the use of a hierarchical synthetic context-based object library is presented. The requesting computer 702 sends a query request 1118 to the security module 706. The security module 706 can then point (using pointer 1120) to the vertical library 1004 described in FIG. 10. This allows pointers 1106, 1110, and 1114 to access all data stores 1102m-1102p that are pointed to by synthetic context-based objects 404a, 810a, and 910b. However, if security module 706 points (i.e., directs the query request 1118) to synthetic context-based object 810a (using pointer 1122), then only data stores 1102m and 1102n from data structure 1104 are accessed for the user (using pointers 1108 and 1112). Similarly, if the security module 706 uses a pointer 1124 to point to synthetic context-based object 910b, then only pointer 1116 is used to point to data store 1102p. The degree of pointing to data stores is due to the context of the query. That is, if the security module 706 determines that the scope of the query warrants the use of all synthetic context-based objects in vertical library 1004, then three data stores (1102m, 1102n, 1102p) are accessed. However, if the scope/context of the query is much narrower, then only data store 1102p is accessed. Similarly, an intermediate synthetic context-based object (e.g., 810a) can be used to access data stores related to both that synthetic context-based object as well as its parent (i.e., synthetic context-based object 404a).

FIG. 12, a high-level flow chart of one or more steps performed by a computer processor to secure data stores through the user of synthetic context-based objects is presented. After initiator block 1202, a non-contextual data object is associated with a context object to define a synthetic context-based object (block 1204). As described herein, the non-contextual data object ambiguously relates to multiple subject-matters. Standing alone, it is unclear as to which of these multiple-subject matters the data in the non-contextual data object is directed. However, the context object provides a context that identifies a specific subject-matter, from the multiple subject-matters, of the non-contextual data object.

As described in block 1206, the synthetic context-based object is associated with at least one specific data store. This at least one specific data store contains data that is associated with data contained in the non-contextual data object and the context object. That is, the data in the data store may be identical to that found in the non-contextual data object and the context object (i.e., the terms "good company" and "products" are in both the data store as well as the respective non-contextual data object and context object); it may be synonymous to that found in the non-contextual data object and the context object (i.e., the terms "good company" and "products" are the respective non-contextual data object and context object while synonyms "strong enterprise" and "goods" are in the data store); and/or it may simply be deemed related by virtue of a lookup table that has been previously created (i.e., the term "good company" is mapped to the term "strong enterprise" and/or the term "products" is mapped to the term "goods" in a lookup table or similar associative data structure).

In one embodiment, the terms in the data stores are identified by data mining a data structure in order to locate the data from the non-contextual data object and the context object in one or more data stores. Thus, this data mining locates at least one specific data store that contains data contained in the non-contextual data object and the context object.

In one embodiment, the data store is a text document. In this embodiment, the data mining entails searching the text document for text data that is part of the synthetic context-based object, and then associating the text document that contains this text data with the synthetic context-based object.

In one embodiment, the data store is a video file. In this embodiment, the data mining entails searching metadata associated with the video file for text data that is part of the synthetic context-based object, and then associating the video file having this metadata with the synthetic context-based object.

In one embodiment, the data store is a web page. In this embodiment, the data mining entails searching the web page for text data that is part of the synthetic context-based object, and then associating the web page that contains this text data with the synthetic context-based object.

Note that in one embodiment, the specific subject-matter for a particular data store in the data structure is exclusive to only that particular data store. That is, only one data store is mapped to a particular synthetic context-based object, such that there is a one-to-one relationship between each synthetic context-based object and each data store. Note further that in another embodiment, the specific subject-matter for a particular data store in the data structure overlaps at least one other data store. That is, multiple data stores are mapped to a particular synthetic context-based object, such that there is a one-to-many relationship between a particular synthetic context-based object and multiple data stores.

Figure 8:
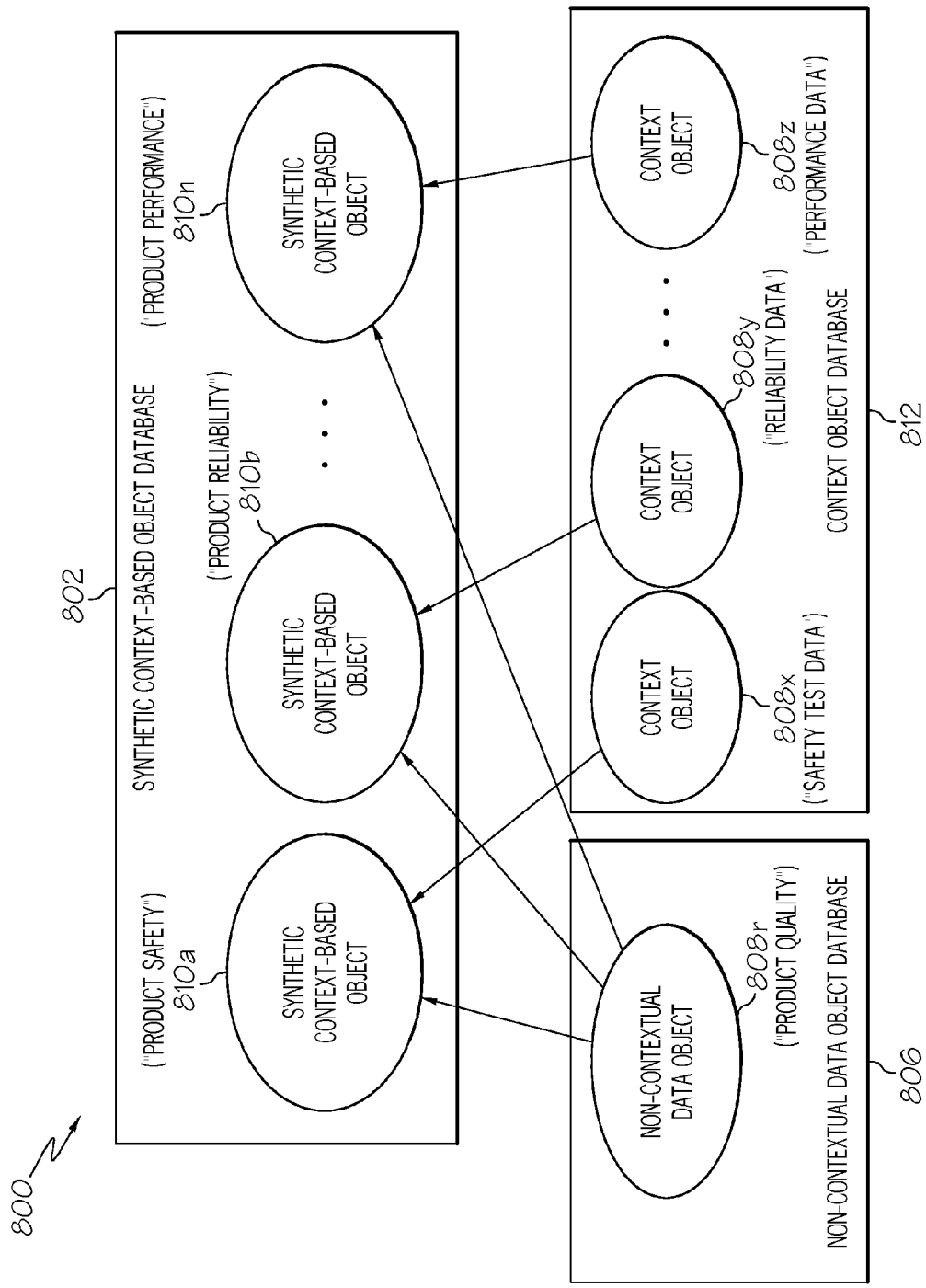
FIGS. 8-9 illustrate a hierarchical creation of synthetic context-based objects.

As described in FIG. 8-FIG. 10, the synthetic context-based object used to point to one or more data stores may be from a dimensionally constrained hierarchical synthetic context-based object library (e.g., vertical library 1004 in FIG. 10), which has been constructed for multiple synthetic context-based objects. As described herein, synthetic context-based objects within a same dimension of the dimensionally constrained hierarchical synthetic context-based object library share data from a same non-contextual data object, and synthetic context-based objects within the same dimension of the dimensionally constrained hierarchical synthetic context-based object library contain disparate data from different context objects.

With reference now to block 1208, a request from a user for data related to an ambiguous subject-matter is received (e.g., by computer 102 in FIG. 1 and/or by security module 706 shown in FIG. 7). The processor then determines a context of the ambiguous request from the user. In one embodiment, this is performed by identifying the user (block 1210), such that the user's identity provides the needed information to determine the context of the request. In one embodiment, this context determination is performed by determining the purpose of the request (block 1212). This determination may be performed by receiving a user input (e.g., from pane 614) in FIG. 6 that described the purpose.

In one embodiment, the purpose of the ambiguous request is determined by data mining a database that describes current interests of the requesting user. For example, if the user uses websites and social networks devoted to financial investing, then the purpose of the request is deemed to be related to obtaining information about the financial strength of a company.

In one embodiment, the purpose of the ambiguous request is determined by data mining a database that describes an educational background of the specific user. For example, enrollment/alumni databases are data mined in order to determine the type and level of education a particular user has. This type/level of education provides the information needed to determine the context (i.e., what is the user actually asking for?) to the search request.

In one embodiment, the purpose of the ambiguous request is determined by data mining a database that identifies interests of friends of the specific user. For example, if social networking sites used by the requesting user show that the user has many friends in the investment community, then the request is deemed to be related to requesting financial information about a company.

In one embodiment, the purpose of the ambiguous request is determined by data mining a database that describes where the specific user resides. Thus, questions from a person living in a particular geographic location differ from those asked by a person living in another city, since they have different contexts (i.e., different seasons, different local restaurants, etc.), and thus different purposes for the requests.

In one embodiment, the purpose of the ambiguous request is determined by data mining a database that describes an employment history of the specific user. Thus, persons who have worked in certain jobs for particular employers have context-specific personas that identify the context, and thus the purpose, of their search request.

Once the context of the query is determined (according to the identity of the requester or the purpose of the request), the previously ambiguous request is now a contextual request that is meaningful.

As depicted in query block 1214, a determination is then made (e.g., by security module 706) as to whether the person asking the question, and/or the purpose of the query, is proper for a particular data store. If not, then access to that data store is blocked (blocks 1216 and 1218). For example, if the purpose of a query is to obtain information about a company's product line, then information in data stores about that company's financial information is blocked to the user.

However, if the purpose of the request is appropriate for accessing a particular data store (as determined by the security module 706), then the context of the now contextual request from the user is associated with a particular synthetic context-based object, in order to point the request to a specific data store that contains data that is related to the context of the request from the user (block 1220). As described in block 1222, the user is then provided access to only the appropriate data store, which access to other data stores in the data structure is blocked for that user. The process ends at terminator block 1224.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method for securing data stores, the processor-implemented method comprising:
    associating, by one or more hardware processors, a non-contextual data object with a context object to define a synthetic context-based object, wherein the non-contextual data object ambiguously relates to multiple subject-matters, wherein the context object is selected from a plurality of context objects stored in a context object database, wherein the context object provides a context that identifies a specific subject-matter, from the multiple subject-matters, of the non-contextual data object, and wherein data within the non-contextual data object is generic until said data is matched to a specific context object from the context object database;
    associating, by the one or more hardware processors, the synthetic context-based object with at least one specific data store in a data structure, wherein said at least one specific data store comprises data that is associated with data contained in the non-contextual data object and the context object;
    receiving, by the one or more hardware processors, a string of binary data, wherein the string of binary data describes an ambiguous request from a user for data related to an ambiguous subject-matter;
    determining, by the one or more hardware processors, a context of the ambiguous request from the user to create a contextual request;
    associating, by the one or more hardware processors, the context of the contextual request from the user with the synthetic context-based object, wherein said at least one specific data store contains data that is related to the context of the contextual request from the user;
    receiving, by the one or more hardware processors, the user input that describes the purpose of the ambiguous request;
    determining, by the one or more hardware processors, the context of the ambiguous request from the user according to a purpose of the ambiguous request;
    providing, by the one or more hardware processors, the user with access to said at least one specific data store while blocking access to other data stores in the data structure;
    constructing, by the one or more hardware processors, a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;

receiving, from the user, the ambiguous request for at least one data store that is associated with synthetic context-based objects within the same dimension of the dimensionally constrained hierarchical synthetic context-based object library; and returning, to the user, said at least one specific data store that is associated with synthetic context-based objects within the same dimension of the dimensionally constrained hierarchical synthetic context-based object library.

2. The processor-implemented method of claim 1, further comprising:

determining, by the one or more hardware processors, the purpose of the ambiguous request by data mining a database that describes current interests of the user.

3. The processor-implemented method of claim 1, further comprising:

determining, by the one or more hardware processors, the purpose of the ambiguous request by data mining a database that describes an educational background of the user.

4. The processor-implemented method of claim 1, further comprising:

determining, by the one or more hardware processors, the purpose of the ambiguous request by data mining a database that identifies friends of the user.

5. The processor-implemented method of claim 1, further comprising:

determining, by the one or more hardware processors, the purpose of the ambiguous request by data mining a database that describes where the user resides.

6. The processor-implemented method of claim 1, further comprising:

determining, by the one or more hardware processors, the purpose of the ambiguous request by data mining a database that describes an employment history of the user.

7. The processor-implemented method of claim 1, further comprising:

determining, by the one or more hardware processors, the context of the ambiguous request according to an identity of the user.

8. The processor-implemented method of claim 1, wherein said at least one specific data store is a text document, and wherein the processor-implemented method further comprises:

searching, by the one or more hardware processors, the text document for text data that is part of the synthetic context-based object; and associating the text document that contains said text data with the synthetic context-based object.

9. The processor-implemented method of claim 1, wherein said at least one specific data store is a video file, and wherein the processor-implemented method further comprises:

searching, by the one or more hardware processors, metadata associated with the video file for text data that is part of the synthetic context-based object; and associating the video file having said metadata with the synthetic context-based object.

10. The processor-implemented method of claim 1, wherein said at least one specific data store is a web page, and wherein the processor-implemented method further comprises:

searching, by the one or more hardware processors, the web page for text data that is part of the synthetic context-based object; and associating the web page that contains said text data with the synthetic context-based object.

11. A computer program product for securing data stores, the computer program product comprising a non-transitory computer readable storage medium having program code embodied therewith, the program code readable and executable by a processor to perform a method comprising:

associating a non-contextual data object with a context object to define a synthetic context-based object, wherein the context object is selected from a plurality of context objects stored in a context object database, wherein the non-contextual data object ambiguously relates to multiple subject-matters, wherein the context object provides a context that identifies a specific subject-matter, from the multiple subject-matters, of the non-contextual data object, and wherein data within the non-contextual data object is generic until said data is matched to a specific context object from the context object database;

associating the synthetic context-based object with at least one specific data store in a data structure, wherein said at least one specific data store comprises data that is associated with data contained in the non-contextual data object and the context object;

receiving an ambiguous request from a user for data related to an ambiguous subject-matter;

determining a context of the ambiguous request from the user to generate a contextual request;

associating the context of the contextual request from the user with the synthetic context-based object, wherein said at least one specific data store contains data that is related to the context of the ambiguous request from the user;

receiving the user input that describes the purpose of the ambiguous request;

determine the context of the ambiguous request from the user according to a purpose of the ambiguous request;

providing the user with access to said at least one specific data store while blocking access to other data stores in the data structure;

constructing a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;

receiving, from the user, the ambiguous request for at least one data store that is associated with synthetic context-based objects within the same dimension of the dimensionally constrained hierarchical synthetic context-based object library; and returning, to the user, said at least one specific data store that is associated with synthetic context-based objects within the same dimension of the dimensionally constrained hierarchical synthetic context-based object library.

12. The computer program product of claim 11, wherein the program code is further readable and executable by the processor to:
determine the purpose of the ambiguous request by data mining a database that describes current interests of the user.

13. A computer system comprising:
a processor, a computer readable memory, and a computer readable storage medium;
first program instructions to associate a non-contextual data object with a context object to define a synthetic context-based object, wherein the non-contextual data object ambiguously relates to multiple subject-matters, wherein the context object is selected from a plurality of context objects stored in a context object database, wherein the context object provides a context that identifies a specific subject-matter, from the multiple subject-matters, of the non-contextual data object, and wherein data within the non-contextual data object is generic until said data is matched to a specific context object from the context object database;
second program instructions to associate the synthetic context-based object with at least one specific data store in a data structure, wherein said at least one specific data store comprises data that is associated with data contained in the non-contextual data object and the context object;
third program instructions to receive an ambiguous request from a user for data related to an ambiguous subject-matter;
fourth program instructions to determine a context of the ambiguous request from the user to generate a contextual request;
fifth program instructions to associate the context of the contextual request from the user with the synthetic context-based object that is associated with said at least one specific data store, wherein said at least one specific data store contains data that is related to the context of the ambiguous request from the user;
sixth program instructions to receive the user input that describes the purpose of the ambiguous request; and wherein the sixth program instructions are stored on the computer readable storage medium for execution by the processor via the computer readable memory;
seventh program instructions to determine the context of the ambiguous request from the user according to a purpose of the ambiguous request; and wherein the seventh program instructions are stored on the computer readable storage medium for execution by the processor via the computer readable memory;
eighth program instructions to provide the user with access to said at least one specific data store while blocking access to other data stores in the data structure;
ninth program instructions to construct a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;
tenth program instructions to receive, from the user, the ambiguous request for at least one data store that is associated with synthetic context-based objects within the same dimension of the dimensionally constrained hierarchical synthetic context-based object library; and
eleventh program instructions to return, to the user, said at least one specific data store that is associated with synthetic context-based objects within the same dimension of the dimensionally constrained hierarchical synthetic context-based object library;
and wherein the first, second, third, fourth, fifth, sixth, seventh, eighth, ninth, tenth, and eleventh program instructions are stored on the computer readable storage medium for execution by the processor via the computer readable memory.

* * * * *